(12) United States Patent
Nakano

(10) Patent No.: US 6,943,855 B2
(45) Date of Patent: Sep. 13, 2005

(54) REFLECTION SHEET AND BACKLIGHT UNIT USING THE SAME

(75) Inventor: Shoji Nakano, Wakayama (JP)

(73) Assignee: Keiwa Inc., Osaka (JP)

( * ) Notice: Subject to any disclaimer, the term of this patent is extended or adjusted under 35 U.S.C. 154(b) by 35 days.

(21) Appl. No.: 10/243,365

(22) Filed: Sep. 12, 2002

(65) Prior Publication Data

US 2004/0052079 A1 Mar. 18, 2004

(51) Int. Cl.$^7$ .............................................. G02F 1/1335
(52) U.S. Cl. ...................................... 349/65; 349/166
(58) Field of Search ............................. 349/64, 65, 67, 349/166; 359/584; 438/30

(56) References Cited

U.S. PATENT DOCUMENTS

| | | | | |
|---|---|---|---|---|
| 5,138,472 A | * | 8/1992 | Jones et al. ................. | 349/166 |
| 5,991,080 A | * | 11/1999 | Kohta et al. ................ | 359/584 |
| 6,011,601 A | * | 1/2000 | Kojima ........................ | 349/62 |
| 6,163,350 A | * | 12/2000 | Ihara ........................... | 349/58 |
| 6,425,673 B1 | | 7/2002 | Suga et al. | |
| 6,580,478 B2 | | 6/2003 | Kim | |
| 6,602,596 B2 | * | 8/2003 | Kimura et al. .............. | 428/327 |
| 6,613,599 B2 | * | 9/2003 | Imaeda ........................ | 438/30 |

FOREIGN PATENT DOCUMENTS

| | | |
|---|---|---|
| JP | 08-262208 | 10/1996 |
| JP | 11-316307 | 11/1999 |
| JP | 2000-122056 | 4/2000 |
| JP | 2001-166115 | 6/2001 |
| JP | 2001-166295 | 6/2001 |
| KR | 010047842 | 6/2001 |
| WO | 97/08252 | 3/1997 |

OTHER PUBLICATIONS

U.S. Appl. No. 10/243,327, filed Sep. 12, 2002, Shoji Nakano.
Rubber, Organic Chemistry, The columbia Electronic Encyclopedia Copyright 2003, Columbia University Press, Licensed from Columbia University Press. All rights reserved. http://reference.allrefer.com/encyclopedia/R/rubber-synthetic-rubber.html.

* cited by examiner

Primary Examiner—Kenneth Parker
Assistant Examiner—David Chung
(74) Attorney, Agent, or Firm—Jordan and Hamburg LLP

(57) ABSTRACT

An object of the present invention is to provide a reflection sheet which can improve reflection property and concealing property, and a backlight unit capable of attempting the improvement of brightness and the prevention of lack in uniformity of the brightness through decreasing loss of rays of light using said reflection sheet.

Specifically, disclosed is a reflection sheet which is provided to the back face side of the backlight unit to reduce the loss of rays of light to the back face side, and which may include a substrate sheet layer made of a white synthetic resin and a highly concealing layer overlaid to the back face side of the substrate sheet layer, wherein the highly concealing layer has luminosity (L*) of equal to or greater than 95. In addition, further disclosed is a backlight unit for use in a liquid crystal display device including this reflection sheet to the back face side of an optical waveguide plate.

6 Claims, 2 Drawing Sheets

REFLECTION SHEET AND BACKLIGHT UNIT USING THE SAME

BACKGROUND OF THE INVENTION

1. Field of the Invention

The present invention relates to reflection sheets for a backlight unit which reduce loss of rays of light, and backlight units in which this reflection sheet is used.

2. Description of the Related Art

Liquid crystal equipments in widespread use have been in a backlight system where light emission is executed by irradiating onto a liquid crystal layer from the back face. In such a type of equipment, a backlight unit which is edge light type, immediate beneath type or the like is provided to an under face side of the liquid crystal layer Such a backlight unit 20 of an edge light type is generally equipped with a rod-shaped lamp 21 for use as a light source, an optical waveguide plate 23 having a square plate shape disposed so that the edge thereof abuts along the lamp 21, multiple optical sheets 22 overlaid to the front face side of the optical waveguide plate 23, and a reflection sheet 26 overlaid to the back face side of the waveguide plate 23, as shown in FIG. 3. Each of the optical sheets 22 has specified optical properties such as refraction, diffusion and the like. Specifically, included are a light diffusion sheet 24 provided on the front face side of the optical waveguide plate 23, a prism sheet 25 provided on the front face side of the light diffusion sheet 24, and the like.

Referring to functions of the backlight unit 20, rays of incident light from the lamp 21 to the optical waveguide plate 23 are first reflected on reflection dots (not shown in the Figure) of the back face of the waveguide plate 23 and on each of the side faces, and exit from the front face of the waveguide plate 23. The rays of light that exited from the waveguide plate 23 enter into the light diffusion sheet 24, then diffuse and exit from the front face of the light diffusion sheet 24. Thereafter, the rays of light exited from the light diffusion sheet 24 enter into a prism sheet 25, and exit as rays having a distribution representing a peak in a direction along a substantially normal line through a prism part 25a formed on the front face of the prism sheet 25. Accordingly, the rays of light exited from the lamp 21 are diffused by the light diffusion sheet 24, while being refracted by the prism sheet 25 so that they represent a peak in a direction along the substantially normal line, and illuminate the entire face of the upper liquid crystal layer although not shown in the Figure.

Meanwhile, a reflection sheet 26 is provided to the back face side of the optical waveguide plate 23 for the purpose of: attempting the improvement of brightness through reflecting rays of light that are radiated from the back face of the optical waveguide plate 23 to the front face side in an extent that glare does not result thereby (reflection property); and preventing instruments, frames and the like that are provided to the back face side of the backlight unit 20 from becoming visible (concealing property). Examples of such a reflection sheet 26 which may be conventionally used include: (a) sheets made of a synthetic resin including a white pigment dispersed therein; (b) sheets made of a synthetic resin including voids (bubbles) dispersed therein for light scattering; (c) sheets having a surface formed into a mat shape; and the like.

Because the conventional reflection sheets 26 described above exhibit concealing property which is not that eminent, reflectance may be too high on some parts such as a frame that supports the backlight unit 20, thereby causing lack in uniformity of the brightness.

In order to prevent such disadvantages, printing for decreasing the reflectance on the parts such as frames described above which are responsible for lack in uniformity of the brightness, or printing for improving the concealing property to the back face of the reflection sheet 26 may be required, and thus the manufacturing process becomes complicated in connection with such a printing operation.

SUMMARY OF THE INVENTION

The present invention was accomplished taking into account of such disadvantages. An object of the present invention is to provide a reflection sheet having eminent reflection property and concealing property, and a backlight unit capable of attempting the improvement of brightness and the prevention of lack in uniformity of the brightness by way of decreasing loss of rays of light using said reflection sheet.

The present invention accomplished to solve the problems described above is a reflection sheet for a backlight unit which reduces loss of rays of light, which comprises a substrate sheet layer made of a white synthetic resin, and a highly concealing layer overlaid to the back face side of the substrate sheet layer, wherein this highly concealing layer has luminosity ($L^*$) of equal to or greater than 95. The term "white synthetic resin" herein refers to a synthetic resin that exhibits white color through blending a white pigment or dispersing minute bubbles. Additionally, "luminosity ($L^*$)" is a value which is defined according to JIS-Z8729.

This reflection sheet allows for comparable reflection property and concealing property to those of conventional reflection sheets by employing a substrate sheet layer made of a white synthetic resin, and in addition, enables to markedly improve the reflection property and concealing property by employing a highly concealing layer having a luminosity ($L^*$) of equal to or greater than 95 which is overlaid to the back face side of the substrate sheet layer.

The highly concealing layer of this reflection sheet may be formed by coating a paint which contains a white pigment. By coating a paint which contains a white pigment in this manner, a highly concealing layer having a luminosity ($L^*$) of equal to or greater than 95 with a white pigment packed at a high density is overlaid on the back face side of the substrate sheet layer. On behalf of such a highly concealing layer, reflection property and concealing property as described above can be effectively achieved.

The amount of the white pigment to be blended on the basis of the solid content of the above-described paint is preferably equal to or greater than 70% by weight and equal to or less than 95% by weight. By way of blending the white pigment in an amount in the range described above, luminosity ($L^*$) of the highly concealing layer can be elevated to equal to or greater than 95, and thus the improvement of the reflection property and concealing property can be promoted.

The amount of the paint described above to be coated is preferably equal to or greater than 1 $g/m^2$ and equal to or less than 50 $g/m^2$ on solid base equivalent. By way of adopting the amount of the paint to be coated in the range described above, luminosity ($L^*$) of the highly concealing layer can be elevated to equal to or greater than 95, and thus the improvement of the reflection property and concealing property can be effectively attained.

Titanium oxide is preferred as the white pigment described above. Titanium oxide affords the most excellent action in the improvement of the concealing property, as well as potent action in the improvement of durability, weather resistance and the like, which can prolong life span of the reflection sheet.

Further, a light diffusion layer may be overlaid to the front face side of the substrate sheet layer described above in the reflection sheet. According to this means, the concealing property can be further enhanced due to the diffusion of rays of light which are reflected on the reflection sheet by the light diffusion action of the light diffusion layer overlaid to the front face side of the substrate sheet layer.

This light diffusion layer suitably includes a binder and a light diffusion agent dispersed in this binder. According to this means, more potent action to enhance the reflection property and concealing property as described above is achieved, because strong light diffusion property is exerted resulting from the light diffusion agent dispersed in the binder.

Moreover, it is also suitable that the light diffusion layer includes a substrate polymer and bubbles dispersed in this substrate polymer. According to this means, the reflection property and concealing property as described above can be enhanced, because strong light diffusion property is exerted resulting from reflection and refraction on the interface of the bubbles dispersed in the substrate polymer.

Flexible urethane beads can be used as the light diffusion agent described above. According to this means, the back face of the optical waveguide plate, in particular, concavity and convexity and the like formed on this back face can be prevented from getting scratched, because protruding flexible urethane beads provided on the front face of this reflection sheet abut to the back face of the optical waveguide plate.

Therefore, a backlight unit for use in a liquid crystal display device equipped with (a) a lamp in a linear shape, (b) an optical waveguide plate which is provided so that it lays along this lamp, and which guides rays of light emitted from the lamp to the front face side, (c) one or more optical sheet(s) which is provided to the front face side of this optical waveguide plate, and which diffuses the rays of light that exited from the above optical waveguide plate in a substantially uniform manner and refracts them to a direction of the normal line, and (d) the above-described reflection sheet of the present invention provided to the back face side of the optical waveguide plate described above can reduce loss of rays of light radiated from the back face side and can improve the brightness on behalf of strong reflection property and concealing property achieved by this reflection sheet. In addition, occurrence of lack in uniformity of the brightness can be prevented without printing on frames or the like, as needed for conventional backlight units.

DESCRIPTION OF THE PREFERRED EMBODIMENTS

Embodiments of the present invention are described in detail below with reference to the figures ad libitum.

Figure 1:
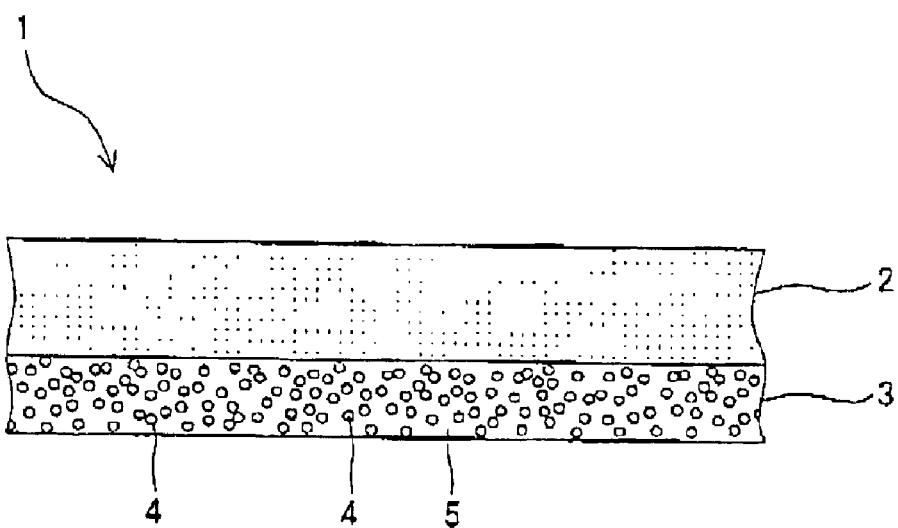
FIG. 1 depicts a schematic cross sectional view illustrating a reflection sheet according to one embodiment of the present invention.

A reflection sheet 1 in FIG. 1 includes a substrate sheet layer 2, and a highly concealing layer 3 overlaid on the back face of this substrate sheet layer 2.

This substrate sheet layer 2 is formed from a white synthetic resin. This white synthetic resin is a synthetic resin containing a white pigment or minute bubbles dispersed therein as described above. Synthetic resin which can be used for this substrate sheet layer 2 is not particularly limited, however, included are for example, polyethylene terephthalate, polyethylene naphthalate, acrylic resin, polycarbonate, polystyrene, polyolefin, cellulose acetate, weather resistant vinyl chloride, and the like. Among them, polyethylene terephthalate having an excellent heat resistance is preferred. Additionally, the white pigments to be contained can be similar to those used in conventional reflection sheets, specifically, white pigments which are used for the highly concealing layer 3 described below may be utilized. Further, with regard to bubbles to be contained and dispersed are also similar to those used in conventional reflection sheets.

Although thickness of the substrate sheet layer 2 is not particularly limited, it may be for example, equal to or greater than 50 μm, and equal to or less than 250 μm. When the thickness of the substrate sheet layer 2 is less then the above range, curling is liable to occur upon coating of the resin composition for forming the highly concealing layer 3. To the contrary, when the thickness of the substrate sheet layer 2 is greater than the above range, thickness of the backlight unit becomes too large, which results in adverse demand for thin modeling of a liquid crystal display device.

Although the highly concealing layer 3 is not particularly limited as long as the above-described concealing property can be achieved, specifically, it is formed on the back face of the substrate sheet layer 2 described above by coating a paint 5 that contains the white pigment 4. The paint which may be used for this highly concealing layer 3 is not particularly limited, and thus common paints may be used.

Luminosity (L*) of the highly concealing layer 3 (that is, luminosity (L*) of the back face of the reflection sheet 1) is equal to or greater than 95, and particularly preferably 97 or greater. By defining the luminosity (L*) of the highly concealing layer 3 in the above-described range, the reflection property and concealing property can be enhanced without bringing deterioration in quality of the backlight unit (e.g., glare and the like).

The white pigment 4 is not particularly limited, however, included may be for example, titanium oxide (white titanium), zinc oxide (flower of zinc), lead carbonate (white lead), barium sulfate, calcium carbonate (whiting chalk) and the like. Among them, titanium oxide is preferred which exhibits a strong effect to improve the concealing property.

Lower limit of the amount of the white pigment 4 to be blended on the basis of the solid content of the paint 5 described above is preferably 70% by weight, and particularly preferably 80% by weight. On the other hand, upper limit of the amount thereof to be blended is preferably 95% by weight, and particularly preferably equal to or less than 90% by weight Grounds for these limits are: smaller amount of the white pigment 4 to be blended than the lower limit described above results in deteriorated effects to improve the reflection property and concealing property described above by the highly concealing layer 3; and to the contrary, greater amount of the white pigment 4 than the upper limit described above results in difficulties in coating of the paint 5.

Lower limit of the amount of the paint 5 to be coated (on solid base equivalent) is 1 g/m², particularly preferably 5 g/m², and more preferably 10 g/m². To the contrary, upper limit of the amount to be coated (on solid base equivalent) is 50 g/m², particularly preferably 45 g/m², and more preferably 40 g/m². Grounds for these limits are: smaller amount of the paint 5 to be coated than the lower limit described above results in deteriorated effects to improve the reflection property and concealing property described above by the highly concealing layer 3; and to the contrary, greater amount of the paint 5 to be coated than the upper limit described above results in increased thickness of the highly concealing layer 3 to adverse demand for thin modeling of a backlight unit, and to lead to decrease in strength of the highly concealing layer 3.

Particle size of the white pigment 4 (average particle diameter) is preferably equal to or greater than 100 nm and equal to or less than 30 µm, and particularly preferably equal to or greater than 200 nm and equal to or less than 20 µm. When the particle size of the white pigment 4 is below the range described above, difficulties in efficiently achieving the concealing property are raised. To the contrary, when the particle size of the white pigment 4 is above the range described above, uniform dispersion thereof in the paint 5 becomes difficult, and results in a rough back face of the reflection sheet 1.

Process for producing the reflection sheet 1 essentially comprises: a step of preparing a paint 5 through blending a white pigment 4; and a step of coating the paint 5 on the back face of a substrate sheet layer 2.

In accordance with the reflection sheet 1, comparable reflection property and concealing property to those of conventional reflection sheets can be achieved by employing a substrate sheet layer 2 made of a white synthetic resin. In addition, the reflection property and concealing property can be markedly improved by employing a highly concealing layer 3 on the back face of the substrate sheet layer 2. Furthermore, because the reflection sheet 1 includes a highly concealing layer 3 to the back face side of the substrate sheet layer 2, rays of light reflected on the highly concealing layer 3 to the front face side transmit the substrate sheet layer 2 containing a white pigment and the like. Accordingly, the reflected light is dispersed and concealed by the substrate sheet layer 2, leading to the prevention of glare of liquid crystal window resulting from the enhanced reflection property, and to the improvement of the concealing property.

Figure 2:
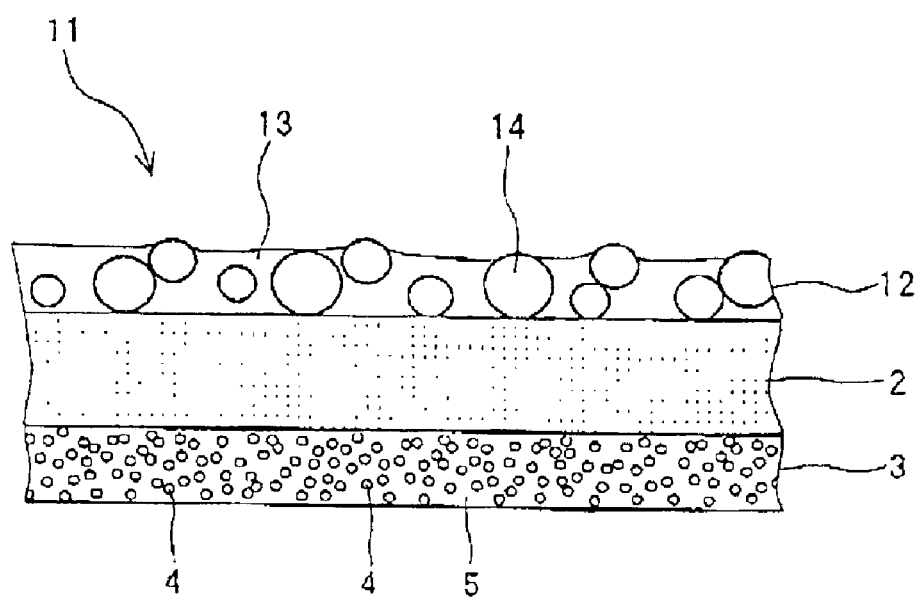
FIG. 2 depicts a schematic cross sectional view illustrating a reflection sheet having different conformation from that in FIG. 1.

A reflection sheet 11 illustrated in FIG. 2 is provided with a substrate sheet layer 2, and a highly concealing layer 3 overlaid on the back face of this substrate sheet layer 2 similarly to the above reflection sheet 1 in FIG. 1. Regarding to the substrate sheet layer 2 and the highly concealing layer 3, explanation is omitted but the identical numbers are assigned thereto. The reflection sheet 11 is further provided with a light diffusion layer 12 overlaid on the front face of the substrate sheet layer 2.

Although this light diffusion layer 12 is not particularly limited as long as it exerts light diffusion property, specifically, it suitably includes a binder 13 and a light diffusion agent 14 dispersed in the binder 13 as shown in FIG. 2. Because eminent light diffusion property is exerted by the light diffusion agent 14 thus dispersed in the binder 13, rays of light that exit to the front face side (for example, rays of light reflected to the front face side on the highly concealing layer 3) are diffused, and consequently, concealing property can be further enhanced. Moreover, because concavity and convexity are formed on the surface of the light diffusion layer 12 due to the light diffusion agent 14, the reflection property is improved, and additionally the concealing property is also enhanced resulting from the improved reflection property.

Polymers used for the binder 13 include for example, acrylic resin, polyurethane, polyester, fluorinated resin, silicone resin, polyamide imide, epoxy resin and the like. To the binder 13, for example, plasticizers, stabilizing agents, deterioration inhibitors, dispersants, antistatic agents and the like may be blended in addition to the polymer described above. This binder 13 is made to be transparent in general, however, a white pigment or bubbles may be dispersed therein to impart the reflection property and concealing property similarly to the substrate sheet layer 2.

Light diffusion agent 14 is a particle having a property to diffuse light, and can be generally classified into inorganic filler and organic filler. Specific examples of the inorganic filler which can be used include silica, aluminum hydroxide, aluminum oxide, zinc oxide, barium sulfide, magnesium silicate, or mixtures thereof. Specific materials for the organic filler which can be used include acryl, acrylonitrile, polyurethane, polyvinyl chloride, polystyrene, polyacrylonitrile, polyamide and the like.

Shape of the light diffusion agent 14 is not particularly limited, which may be for example, spherical, cubic, aciculate, spindle, discal, scale-like, fibrous and the like. Spherical beads are preferred taking into account of the light diffusion property.

Lower limit of the particle size of the light diffusion agent 14 (average particle diameter) is preferably 0.1 µm, and particularly preferably 1 µm. On the other hand, upper limit of the particle size of the light diffusion agent 14 is preferably 100 µm, and particularly preferably 50 µm. When particle size of the light diffusion agent 14 is less than the lower limit described above, promotion of the concealing property due to the light diffusion effect may be insufficient. To the contrary, when particle size of the light diffusion agent 14 is greater than the upper limit described above, formation of the light diffusion layer 12 by coating of a resin composition or the like may be difficult.

Furthermore, flexible light diffusion agent having a low glass transition temperature, specifically, a flexible elastomer material having a glass transition temperature of equal to or higher than −100° C. and equal to or less than 30° C., preferably equal to or higher than −60° C. and equal to or less than 25° C. may be used as the light diffusion agent 14. When a flexible elastomer material is used for the light diffusion agent 14 which protrudes onto the front face of the reflection sheet 11, scratching on the optical waveguide plate provided to the front face side of the reflection sheet 11 can be prevented. Examples of such a flexible elastomer material include polyurethane, silicone rubber, polystyrene, thermoplastic polyester and the like. Among them, polyurethane is preferred in terms of solvent resistance, heat resistance and the like. Accordingly, flexible urethane beads are most preferred in both respects of the hardness and the shape as described above.

Lower limit of the amount of the light diffusion agent 14 to be blended on the basis of 100 parts of polymer content in the binder 13 is preferably 0.1 part, particularly preferably 5 parts, and more preferably 10 parts. To the contrary, upper limit of the amount of the light diffusion agent 14 to be blended is preferably 300 parts, particularly preferably 200 parts, and more preferably 100 parts. Values represented by "parts" herein mean a ratio On the basis of the weight thereof. Grounds for these limits are: smaller amount of the light diffusion agent 14 to be blended than the lower limit described above results in insufficient promotion of the concealing property due to a light diffusion effect; and to the contrary, greater amount of light diffusion agent 14 to be blended than the upper limit described above results in difficulty in forming the light diffusion layer 12 by coating of a resin composition or the like.

Process for producing the reflection sheet 11 essentially comprises: a step of preparing a paint 5 through blending a white pigment 4; a step of coating the paint 5 on the back face of a substrate sheet layer 2; and a step of coating a mixture comprising a light diffusion agent 14 dispersed in a binder 13 on the front face of the substrate sheet 2 followed by drying.

In accordance with the reflection sheet 11, similarly to the reflection sheet 1 described above, comparable reflection property and concealing property to those of conventional reflection sheets can be achieved by employing a substrate sheet layer 2 made of a white synthetic resin. In addition, the reflection property and concealing property can be markedly improved by employing a highly concealing layer 3 on the back face of the substrate sheet layer 2. Furthermore, because the reflection sheet 11 is provided with a light diffusion layer 12 to the front face side of the substrate sheet layer 2, rays of light exited to the front face side by way of reflection on the highly concealing layer 3 are diffused, and thus concealing property can be promoted. Additionally, on behalf of the reflection sheet 11 being formed with concavity and convexity on its front face resulting from the light diffusion layer 12 including the light diffusion agent 14, reflection property toward the front face side can be enhanced in this respect as well, and moreover, the concealing property can be also enhanced.

Figure 3:
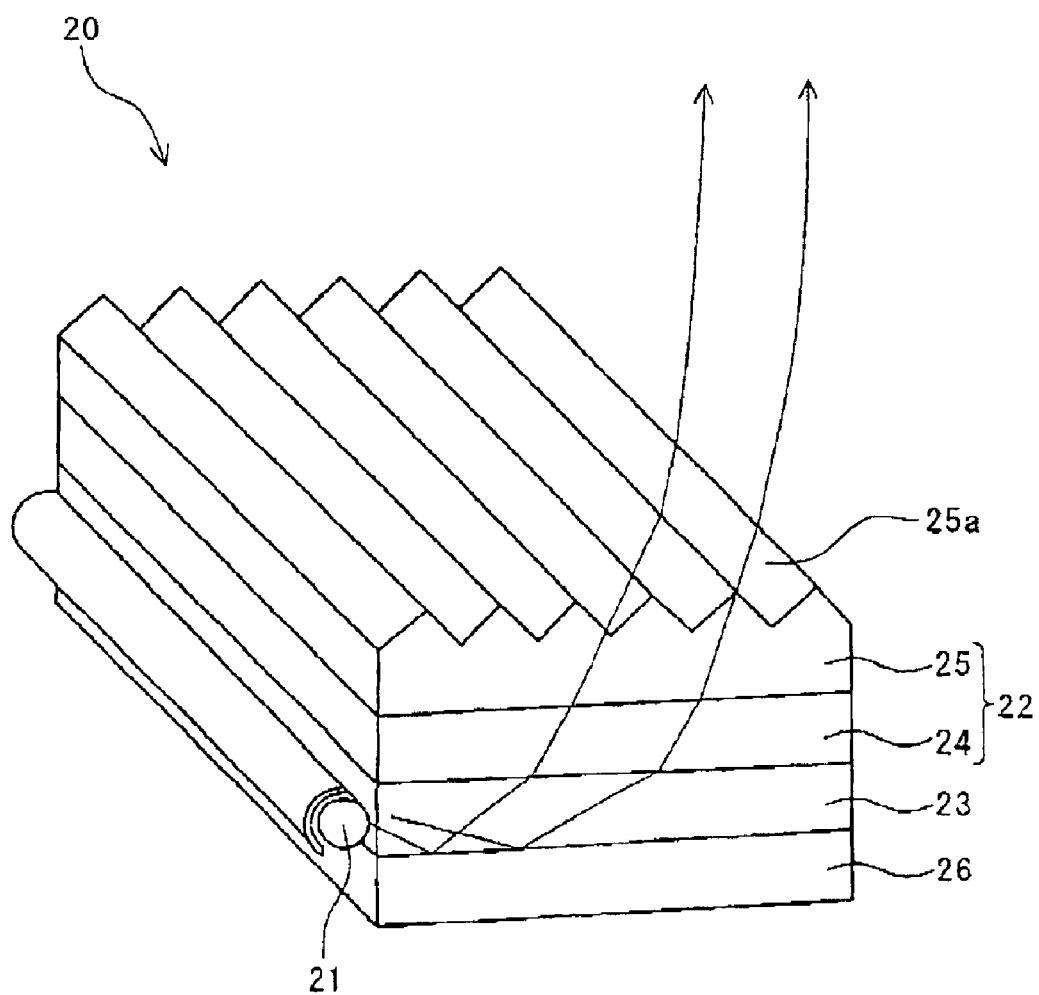
FIG. 3 depicts a schematic perspective view illustrating a common backlight unit of an edge light type.

Accordingly, in a backlight unit 20 of an edge light type as shown in FIG. 3, when the reflection sheet 1 shown in FIG. 1 or the reflection sheet 11 shown in FIG. 2 is used as a reflection sheet 26, on behalf of eminent reflection property of the reflection sheet 1 or 11, loss of rays of light radiated from the back face side can be reduced, thereby improving brightness. Additionally, because the reflection sheet 1 or 11 has an eminent concealing property, frames and the like provided to the back face side can be prevented from becoming visible through the display, and thus occurrence of lack in uniformity of the brightness can be prevented.

Furthermore, the reflection sheet according to the present invention is not limited to the embodiment described herein before, but can be made into, for example, a structure having a light diffusion layer comprising bubbles dispersed in a substrate polymer. Elevated light diffusion property can be achieved by reflection and refraction on the interface of the bubbles, and thus the reflection property and concealing property as described above can be enhanced. Additionally, because the light diffusion layer is flexibilized through dispersion of the bubbles, possible scratching on the optical waveguide plate disposed to the front face side can be reduced.

Process for producing the light diffusion layer including bubbles dispersed therein as described above is not particularly limited, and known process for the production can be adopted. However, exemplary process includes a process in which an expanding agent is added and kneaded in a resin composition containing a thermosetting resin as a principal polymer, and then the resin composition is coated on a surface of a substrate sheet followed by subjecting to heat curing and concomitant expansion by means of the expanding agent. Moreover, in light of the achievement of effective light diffusion property, average diameter of the bubbles is preferably equal to or greater than 0.5 $\mu$m and equal to or less than 100 $\mu$m, and volume percentage of the bubbles to the substrate polymer is preferably equal to or greater than 1 vol % and equal to or less than 80 vol %.

EXAMPLES

The present invention is explained in more detail based on Examples below, however, the present invention should not be construed as being limited to the description of the examples.

Example

A paint for a highly concealing layer was produced by mixing 85% by weight of titanium oxide in a polyurethane resin composition. A sheet made of white PET (polyethylene terephthalate) (manufactured by Toray Industries, Inc., "Lumira-E60L") was used as a substrate sheet layer, of which back face was coated with the above paint at an amount of 40 g/m$^2$ (on the basis of the solid content) to overlay a highly concealing layer so that a reflection sheet of Example was obtained whose back face (highly concealing layer) had luminosity (L*) of 97.7.

Comparative Example 1

Commercially available reflection sheet including a concealing layer on the back face of the substrate sheet layer described above was obtained as a reflection sheet of Comparative Example 1. Luminosity (L*) of the back face (concealing layer) of this reflection sheet was 93.5.

Comparative Example 2

A reflection sheet of Comparative Example 2 consisting of the above-described substrate sheet alone was obtained.

[Evaluation of Properties]

Luminosity (L*) of concealing layers of each of the above Example and Comparative Example is an average value of values from ten points which were measured using "multi-light source spectrophotometric calorimeter (MSC-IS-2DH)" (trade name by Suga Shikenki KK). Using the reflection sheet of the above-described Example and of Comparative Examples 1 and 2, reflectance of each of the reflection sheets, and frontal brightness were measured after charging it in a backlight unit of an edge light type as illustrated in FIG. 3 described above. The reflectance is shown in Table 1 below, and the frontal brightness is shown in Table 2 below.

TABLE 1

| Wave length | Reflectance [%] | | |
|---|---|---|---|
| (nm) | 450 | 550 | 600 |
| Example | 98.5 | 98.6 | 98.6 |
| Comparative Example 1 | 97.5 | 97.3 | 97.3 |
| Comparative Example 2 | 97.7 | 97.6 | 97.5 |

TABLE 2

| | Frontal brightness [cd/m$^2$] |
|---|---|
| Example | 1192 |
| Comparative | 1155 |

TABLE 2-continued

| | Frontal brightness [cd/m²] |
|---|---|
| Example 1 Comparative Example 2 | 1172 |

As is shown in Table 1 and Table 2 above, the reflection sheet of the Example demonstrated higher reflectance and frontal brightness in comparison with the reflection sheet of the Comparative Example 2 which has been conventionally used in general. In addition, the reflection sheet of Example exhibited elevated reflectance by about 1% in comparison with commercially available reflection sheet of Comparative Example 1. Further, average brightness of the backlight unit charged with the reflection sheet of Example was elevated by about 3% in comparison with that of the backlight unit charged with the reflection sheet of Comparative Example 1.

What is claimed is:

1. A light reflecting sheet for a backlit lighting unit, which reduces loss of light rays, comprising:
   a substrate sheet layer, made of a white synthetic resin; and
   a highly concealing layer, overlaid on a back face of the substrate sheet layer, said highly concealing layer formed by coating said back face of said substrate sheet layer with a paint containing a white pigment, said white pigment consisting essentially of titanium dioxide, having a particle size of 100 nm to 30 μm, the white pigment is 70 to 95 weight percent of a total solids content of said paint, said paint on said substrate sheet layer is 1 to 50 g/m², based on a solid base equivalent, and said highly concealing layer has a luminosity (L*) of at least 95.

2. A light reflecting and light diffusing sheet, for a backlit lighting unit, comprising the light reflecting sheet according to claim 1, and further comprising a light diffusion layer, overlaid on a front face of said substrate sheet layer.

3. The light reflecting and light diffusing sheet according to claim 2, wherein said light diffusion layer comprises a light diffusion agent dispersed in a binder.

4. The light reflecting and light diffusing sheet according to claim 3, wherein said light diffusion agent comprises flexible urethane beads.

5. The light reflecting and light diffusing sheet according to claim 2, wherein said light diffusion layer comprises a substrate polymer having bubbles dispersedly entrained therein.

6. The light reflecting and light diffusing sheet according to claim 5, wherein said bubbles are air bubbles.

* * * * *